No. 860,003. PATENTED JULY 16, 1907.
H. B. WILLIAMS.
MEANS FOR INDICATING THE DEFLATION OF TIRES.
APPLICATION FILED AUG. 8, 1906.

WITNESSES:
Fred White
René Buine

INVENTOR:
Harry B. Williams,
By Attorneys,
Arthur E. Fraser & Usina

UNITED STATES PATENT OFFICE.

HARRY B. WILLIAMS, OF NEW YORK, N. Y.

MEANS FOR INDICATING THE DEFLATION OF TIRES.

No. 860,003.

Specification of Letters Patent.

Patented July 16, 1907.

Application filed August 8, 1906. Serial No. 329,710.

*To all whom it may concern:*

Be it known that I, HARRY B. WILLIAMS, a citizen of the United States, residing in the borough of Brooklyn, in the county of Kings, city and State of New York, have invented certain new and useful Improvements in Means for Indicating the Deflation of Tires, of which the following is a specification.

This invention relates to means for detecting the deflation of pneumatic tires in motor cars or the like.

In many cases after a tire is punctured or becomes leaky from any other cause, the escape of air is not noticeable to the operator of the car, so that the first indication of the deflation of the tire which is afforded is the grinding or bumping of the rim upon the road bed. When the driving of the car is continued until the tire is deflated to this extent, the latter is usually badly damaged, and often rendered useless.

According to my invention I provide a means for indicating to the driver the fact that the tire is deflating before any injury can be done to the tire. To this end I provide a member which normally extends or lies beyond the rim of the tire and which tends to raise the wheel at a point in its rotation so as to produce a shock or jar which is noticeable to the driver. Such member preferably is arranged within the tire, and by preference is formed of resilient material so as to avoid any wear upon the latter.

Figure 1:
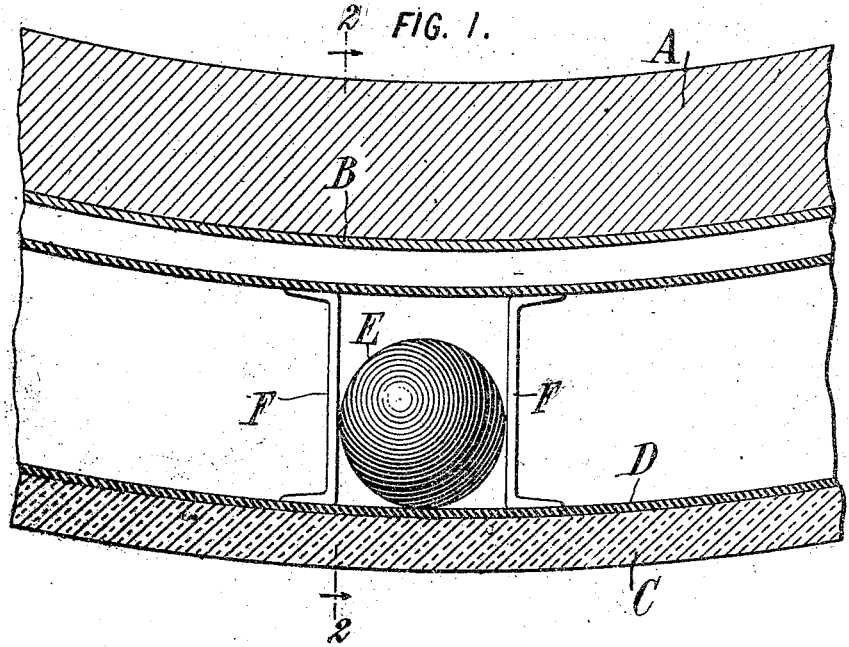
Figure 2:
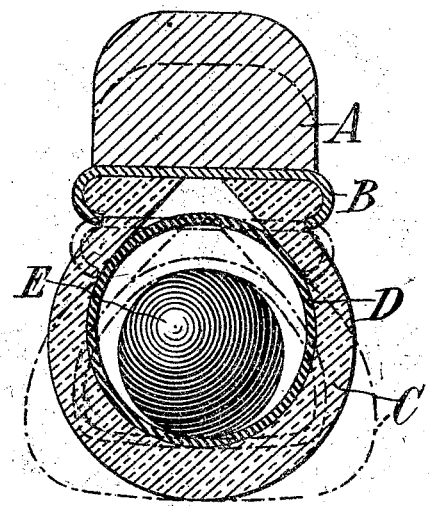

In the drawings wherein I have shown one form of my invention, Figure 1 is a vertical section of a tire and rim taken circumferentially thereof: Fig. 2 is a cross-section of Fig. 1.

Referring to the drawings, let A indicate the felly of a wheel for motor cars or the like, B the ordinary channeled rim, C the outer shoe of a pneumatic tire, and D the usual inner air tube. These parts may be of any construction, being shown merely to illustrate my invention.

The form of member which I prefer to employ for indicating the deflation of the tire is shown at E, and comprises a ball of resilient rubber arranged within the air tube D as shown. I preferably hold the ball E in place within the tube by suitable strips or bands F F, arranged one on each side of the ball, and connected in any suitable way to the walls of the air tube. I may permit the ball to move freely within the tube, but prefer the construction shown as it avoids any possibility of the ball chafing or wearing the tube.

The ball E or other member extends sufficiently beyond the rim to indicate to the driver that the tire is deflated before it is sufficiently flat to cause any damage to the tire. As shown in Fig. 2 in dotted lines the ball will be pressed against the rim by the tread of the tire when the air pressure in the latter is reduced sufficiently to cause the portion which is in contact with the ground to collapse to the extent shown in dotted lines. The ball tends to raise the wheel at each rotation, thus indicating to the driver that the tire is deflated. By changing the size of the ball E, or otherwise varying the extent of its projection beyond the rim, any required degree of deflation will be indicated.

It will be understood that I do not wish to be limited to the construction shown, since I have selected this merely as an example of the means provided by my invention.

Many other constructions may be employed, so long as they indicate to the user of the vehicle that the tire is deflating by a noticeable jar or other signal.

My invention also includes any member arranged within the tire which is adapted to attract the attention of the user to the deflation of the tire.

What I claim is:—

1. In a pneumatic tire, the combination with a continuous pneumatic tube running substantially around the tire, of a member beyond the rim tending to raise the wheel at a point in its rotation when the tire is deflated to a predetermined extent.

2. In a pneumatic tire, the combination with a continuous pneumatic tube running substantially around the tire, of a member within the tire tending to raise the wheel at a point in its rotation when the tire is deflated to a predetermined extent.

3. In a pneumatic tire, the combination with a continuous pneumatic tube running substantially around the tire, of a compressible member beyond the rim tending to raise the wheel at a point in its rotation when the tire is deflated to a predetermined extent.

4. In a pneumatic tire, the combination with a continuous pneumatic tube running substantially around the tire, of a rubber ball or the like beyond the rim and tending to raise the wheel at a point in its rotation when the tire is deflated to a predetermined extent.

5. In a pneumatic tire, the combination with a continuous pneumatic tube running substantially around the tire, of a member within the pneumatic tube, such member extending beyond the rim, and being adapted to indicate the deflation of the tire.

6. In a pneumatic tire, the combination with a continuous pneumatic tube D running substantially around the tire, of a ball E held at a fixed point in the tube and of a less diameter than the internal diameter of said tube, so that when the tube is fully inflated the ball is inoperative, but when the tube is partially deflated the wheel will run upon and over the ball at each revolution.

7. In a pneumatic tire, the combination with a continuous pneumatic tube D running substantially around the tire, of a ball E, and strips F on each side of said ball permitting a free circulation of air around the length of the tire, but preventing substantial movement of the ball, so that when the tube is fully inflated the ball is inoperative, but when the tube is partially deflated the wheel will run upon and over the ball at each revolution.

In witness whereof, I have hereunto signed my name in the presence of two subscribing witnesses.

HARRY B. WILLIAMS.

Witnesses:
DOMINGO A. USINA,
THEODORE T. SNELL.